Aug. 19, 1947.   I. I. SIKORSKY   2,426,123
HELICOPTER BLADE
Filed Feb. 27, 1943
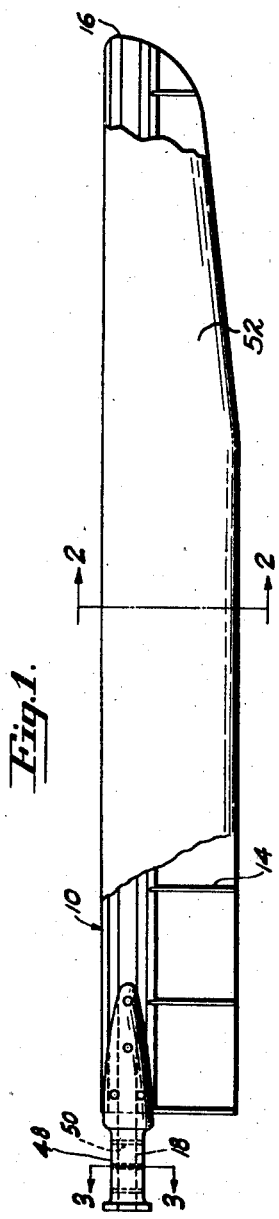
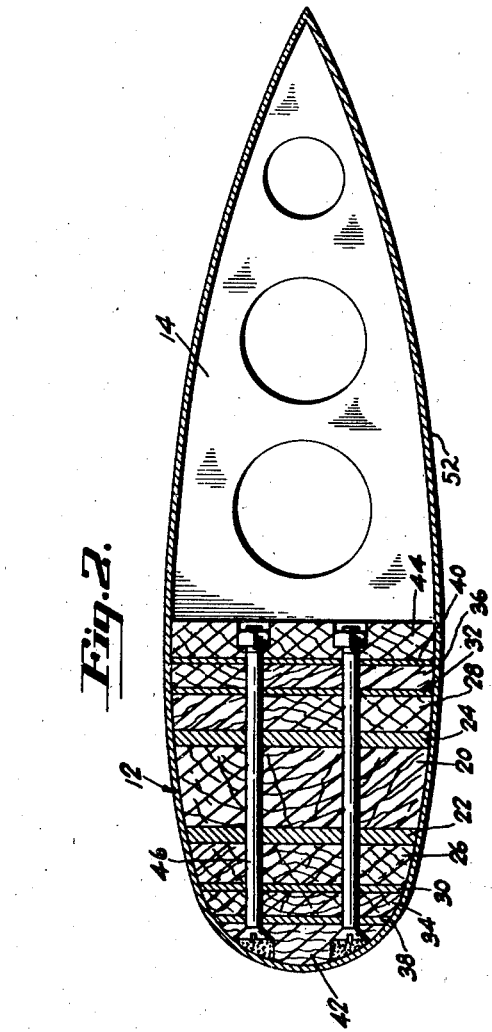
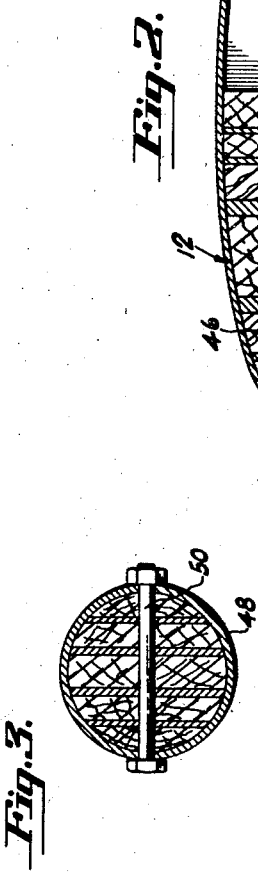
INVENTOR
Igor I. Sikorsky
BY
Harris G. Luther
ATTORNEY Patented Aug. 19, 1947

2,426,123

UNITED STATES PATENT OFFICE 2,426,123

HELICOPTER BLADE

Igor I. Sikorsky, Bridgeport, Conn., assignor to United Aircraft Corporation, East Hartford, Conn., a corporation of Delaware Application February 27, 1943, Serial No. 477,415

3 Claims. (Cl. 170—159)

This invention relates to a wing structure for aircraft, particularly to a wing or blade for a helicopter.

It is customary in rotating wing aircraft to provide a hinged joint in the connection between the rotor blade and its supporting shaft so that the blade may oscillate to and fro in the direction of rotation of the rotor. In order to prevent the building up of objectionable vibrations about this hinge joint a shock absorber is often connected across the joint. This type of construction reduces the forces that would be imposed upon a rigidly held blade so that a much lighter blade may be employed. The construction would, however, be much simpler if this joint could be eliminated and a blade provided which would satisfactorily absorb or resist those forces.

An object of this invention is to provide a rotor having a blade flexible in the direction of its rotation, that is, in a direction substantially parallel to its chord line.

Another object is the provision of a blade having a longitudinal spar, flexible in the direction of rotation of the rotor.

Another object is the provision of a blade spar built up of a series of laminations including laminations for resisting centrifugal force and laminations for damping vibrations.

Other objects and advantages will be apparent from the specification and claims and from the accompanying drawing which illustrates what is now considered to be the preferred embodiment of the invention.

Fig. 1 is a plan view of the rotor blade.

Fig. 2 is a cross-section taken on line 2—2 of Fig. 1.

Fig. 3 is a cross-sectional view taken on line 3—3 of Fig. 1.

The blade indicated generally at 10 has a spar indicated generally at 12 located at the leading edge of the blade and supporting individual ribs 14. The spar extends the entire length of the blade from tip 16 to support 18 at the opposite end. Ribs 14 may be supported from spar 12 by extending the top and bottom flanges of the ribs to form tongues which enter recesses in the upper and lower surfaces of the spar. These tongues may be secured to the spar by any well known means, such as, screws or rivets.

Spar 12 is built up of several laminations symmetrically arranged on each side of the center of the spar and secured together by flexible adhesive as shown in Fig. 2. The central plank or lamination 20 may be either a single board or may be built up of several plies rigidly secured together. The plates 22 and 24 are assembled on either side of the plank 20 and are each formed of one or preferably several sheets of some high tensile material such as steel and are secured together and to the plank by flexible adhesive. A five ply unit is then assembled upon each of the steel plates and secured thereto by flexible adhesive. This five ply unit consists of three plies of wood 26, 34 and 42 on one side and 28, 36 and 44 on the other side separated by and secured together by strips 30 and 38 on one side, and strips 32 and 40 on the other side, of rubber or canvas impregnated with marine glue or other material which will serve to secure the several plies together and act as a friction drag to damp any relative movements between the plies. Although five plies are shown and mentioned it is of course obvious that more or less may be used as desired. The above described built up spar is held together by fastening means such as bolts 46 passed through the entire assembly and holding it in assembled relation. Oval shaped holes may be provided for the bolts to allow for relative movement of the parts.

The blade is assembled with a blade support in the form of a flanged hub member 48 and secured therein by bolts 50. The hub member 48 may be connected to a hub or a drive shaft by well known means.

The assembled spar and rib may be covered by a fabric covering 52 to give the blade its final airfoil shape.

Under a load applied to the blade substantially parallel to a chord of the blade the spar would permit a certain degree of flexing in all the layers of wood which are not rigidly connected together. However, the friction of the damping layers 30, 32, 38 and 40 would prevent the oscillation or spring action of the whole blade which would, therefore, upon a change in the load, move to a new position without continuing to oscillate. The degree of rigidity and of the damping effect can be adjusted by decreasing or increasing the thickness of the wooden layers and of the damping strips. The blade in addition to having a damper incorporated in the structure itself would inherently be very reliable from the standpoint of structural failure because the thin strips of metal 22, 24 that carry all centrifugal loads are well protected from any bending or oscillation that could cause failure. This is so because they are located close to the center of the spar where the movement is slight and because the total bending in the spar would not be very large in any event. While blades of such design would find special utility in constructions where they are held against movement in a chordwise direction, they would also have utility in absorbing vibration on blades which are connected to the shaft by hinge joints.

If desired the blade may be so designed that the major portion of the bending occurs on the inner (hub) half of the blade allowing the tip portion to remain comparatively rigid.

It is to be understood that the invention is not limited to the specific embodiment herein illustrated and described, but may be used in other ways without departure from its spirit as defined by the following claim.

I claim:

1. A spar for a rotor blade comprising a series of superimposed lamina symmetrically arranged with their major surfaces extending longitudinally of said spar and normal to the chord of said blade, including metal lamina for resisting centrifugal forces, viscid material arranged between lamina for damping vibrations producing relative motion of the lamina, and means for holding said spar in assembled relation.

2. A spar for a rotor blade comprising a series of superimposed lamina having their major surfaces extending longitudinally of said spar including metal lamina for resisting centrifugal forces, and viscid material arranged between lamina for damping vibrations producing relative motion of the lamina, and means for holding said spar in assembled relation.

3. A built-up spar for a rotor blade comprising a series of superimposed wood lamina having their major surfaces extending longitudinally of said spar, metal lamina separating wooden lamina near the center of said spar and viscid material separating wooden lamina adjacent the sides of said spar, and means for holding said spar in assembled relation.

IGOR I. SIKORSKY.

REFERENCES CITED

The following references are of record in the file of this patent:

UNITED STATES PATENTS

| Number | Name | Date |
|---|---|---|
| 1,407,271 | Harkins | Feb. 21, 1922 |
| 1,846,256 | Havill | Feb. 23, 1932 |
| 2,056,592 | Siddeley et al. | Oct. 6, 1936 |
| 2,254,821 | Haw | Sept. 2, 1941 |
| 2,272,439 | Stanley et al. | Feb. 10, 1942 |
| 2,020,759 | Atwood | Nov. 12, 1935 |
| 2,183,158 | Bennett | Dec. 12, 1939 |
| 2,303,707 | Pullin | Dec. 1, 1942 |
| 2,340,133 | Martin | Jan. 25, 1944 |

FOREIGN PATENTS

| Number | Country | Date |
|---|---|---|
| 417,139 | Great Britain | Sept. 28, 1934 |
| 504,843 | Great Britain | May 2, 1939 |
| 526,543 | Great Britain | Sept. 20, 1940 |
| 505,625 | Great Britain | May 11, 1939 |

OTHER REFERENCES

Aviation, January, 1943, pages 173 and 175, 170–159C.